United States Patent

Ead et al.

[11] Patent Number: 6,089,299
[45] Date of Patent: Jul. 18, 2000

[54] HAND HELD, FLUID DRIVEN FILM APPLIQUE TOOL

[75] Inventors: Frank M. Ead, Roswell; Jeffrey W. Howard, Kennesaw; Thomas A. Robertson, Lithia Springs, all of Ga.

[73] Assignee: Lockheed Martin Corporation, Bethesda, Md.

[21] Appl. No.: 09/163,973

[22] Filed: Sep. 30, 1998

[51] Int. Cl.$^7$ .................................................. B32B 31/00
[52] U.S. Cl. ............................ 156/579; 156/285; 156/475
[58] Field of Search .............................. 156/71, 212, 224, 156/229, 285, 475, 493, 494, 579; 411/373, 377, 430, 431

[56] References Cited

U.S. PATENT DOCUMENTS

| | | | |
|---|---|---|---|
| 3,704,647 | 12/1972 | Painaud | 411/910 |
| 4,747,241 | 5/1988 | Whitman | 411/377 |
| 4,923,348 | 5/1990 | Carlozzo et al. | 411/431 |
| 5,129,770 | 7/1992 | Coleman | 411/377 |
| 5,419,666 | 5/1995 | Best | 411/377 |
| 5,755,908 | 5/1998 | Rayburn et al. | 156/224 |

*Primary Examiner*—James Sells
*Attorney, Agent, or Firm*—Eric R. Katz

[57] ABSTRACT

A film applique tool is disclosed for manually applying a film having an adhesive backing to a surface having protrusions. The tool comprises a tool head having a hollow cylinder for receiving the protrusion, the hollow cylinder being surrounded by an annular surface which is relatively flat and smooth. A handle is provide for manually holding the tool, as well as a switch for connecting the hollow cylinder to a source of fluid under pressure. In operation, tool head is placed over the protrusion so that the hollow cylinder receives at least the protrusion and the film overlying the protrusion and fluid pressure is applied to the film by connecting the hollow cylinder to the source of fluid pressure to stretch and press the film firmly against both the protrusion and an area of the surface surrounding the protrusion to assure that the film is flatly and completely applied at the protrusion and to the surface in the area surrounding the protrusion.

10 Claims, 2 Drawing Sheets

HAND HELD, FLUID DRIVEN FILM APPLIQUE TOOL

BACKGROUND OF THE INVENTION

1. Field of the Invention

The present invention generally relates to a tool for applying films having an adhesive backing to articles and, more particularly to a hand held, fluid driven film applique tool useful in applying such film to surfaces having raised protrusion, such as fastener heads or the like.

2. Background Discussion

A team composed of Lockheed Martin and 3M are investigating the potential benefits of using "paintless" film appliques instead of paint on commercial and military aircraft. These aircraft appliques consist of adhesive films designed to offer potential savings over conventional paint in production costs, support requirements and aircraft weight. They also offer significant environmental advantages, since commercial and military painting are a major source of volatile organic compounds (VOC's).

Paintless aircraft coatings, when properly applied, can withstand forces of up to 5 g's and speeds up to Mach 1.4. While the average paint coating lasts approximately 3 years, these paintless coatings last up to 5 years and involve no use of solvents in its application or removal.

Most aircraft are painted frequently. Military aircraft have camouflage repainted every time they move to a different theatre of war and airlines have a different livery painted on them every time they are leased to a new operator. Every time this is done, the aircraft must be isolated in a paint shop to protect employees and the environment from a range of toxic solvents and additives present in every paint as well as other VOC compounds which are heavily used in the application and removal of paint coatings.

The self-adhesive plastic films used by paintless technology are quite similar to Teflon and can be printed with the desired livery, camoflague pattern or miliary markings and cut out to the right shape by a computer for application to the complex contours of a particular aircraft type. These sheet are applied under pressure and have no effect on the flying ability of the aircraft.

The paintless film is peeled off using hot, high-pressure water and disposed of as non-hazardous waste. New film is applied by hand in a manner similar to wallpaper. For application to the aircraft, the film is cut into individual pieces (for example 400 or more) using gore cuts to follow the aircraft's curved surfaces. Butt and lap joints are used and edge sealer applied to prevent peeling. Applique shapes can be stored in computer and cut form flat film on demand, using a plotter/cutter when recoating an aircraft. In addition, the paintless film can be applied during routine maintenance, while other work continues on the aircraft.

Proper application of the paintless film requires uniform adhesion of the film to the surface without wrinkles, tears, tenting or creases. This is particular difficult for aircraft, since aircraft surfaces are studded with fasteners, such as, for example, rivets, screws and the like, which have heads the protrude above the surface of the aircraft. These protrusions tend to create tenting of the paintless film which is unacceptable according to the specification requirements of the film. Moreover, the protrusions make it difficult to apply the proper amount of uniform pressure to the film to assure correct bonding of the film's adhesive backing to the aircraft surface.

Heretofore, application of the paintless films at and around the fastener heads on aircraft surfaces has been achieved by applying pressure to the film with the finger tips of the human hand or using a felt squeegee. This is a very time consuming and labor intensive process which creates non-conforming inconsistences which vary from fastener to fastener.

SUMMARY OF THE INVENTION

Accordingly, it is an object of the present invention to provide a hand held, fluid driven film applique tool for applying paintless films to surfaces, such as aircraft surfaces, which have raised protrusions.

It is a further object of the present invention to provide a hand held, fluid driven film applique tool which decrease film application time.

It is a yet another object of the present invention to provide a hand held, fluid driven film applique tool which simplifies application of paintless films around raised protrusion.

One particularly advantageous feature of the present invention is that the hand held, fluid driven film applique tool eliminates tenting, provides uniform application of the paintless film in the area around the fastener as well as acceptable film appearance.

Yet another advantageous feature of the present invention is that the hand held, fluid driven film applique tool uses fluid pressure to force the film to stretch sufficiently to bring it into intimate contact with the surface local to the periphery of the fastener head. This initiate contact of the film with the surface facilitates bonding of the film's adhesive backing to the aircraft surface.

Still other advantageous features of the present invention include its simplistic design, lightweight, ease of use and elimination of electrical power for operation.

These and other objects, advantages and features of the present invention are achieved, according to one embodiment thereof, by a hand held, fluid driven film applique tool for applying a film having an adhesive backing to a surface having a protrusion. The tool includes a tool head comprising a hollow cylinder for receiving the protrusion, the hollow cylinder being surrounded by an annual surface which is relative flat and smooth. A handle is provided for holding the tool and a switch is included for connecting the hollow cylinder to a source of fluid under pressure.

In operation, the tool head is placed over the protrusion so that the hollow cylinder receives at least the protrusion and the film overlying the protrusion and fluid pressure is applied to the film by connecting the hollow cylinder to the source of fluid pressure to press the film firmly against both the protrusion and an area of the surface surrounding the protrusion to assure that the film is flatly and completely applied at the protrusion and to the surface in the area surrounding the protrusion.

DETAILED DESCRIPTION OF THE PREFERRED EMBODIMENT(S)

Figure 1:
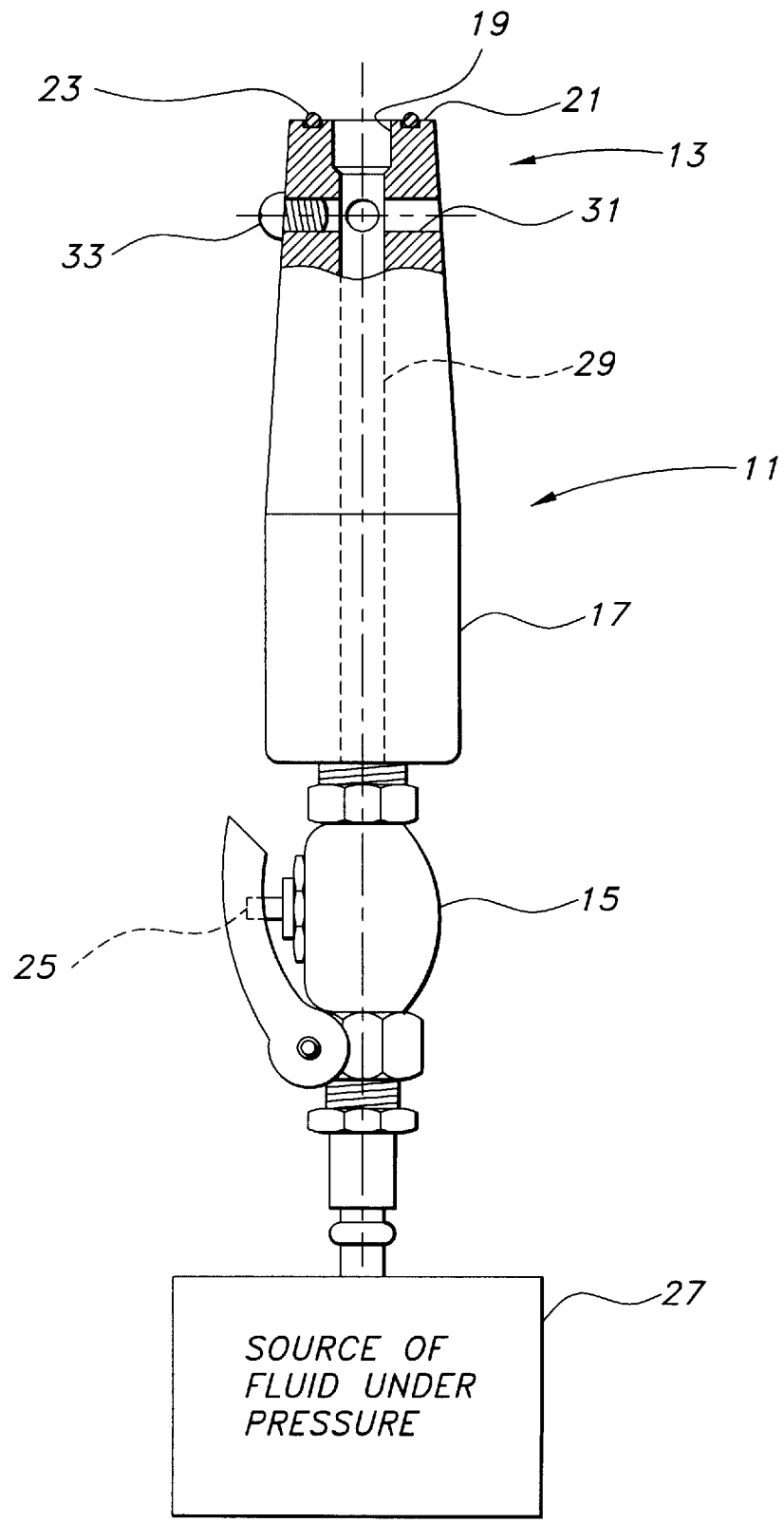
FIG. 1 is side, partially in section view of one embodiment of the film applique tool of the present invention.

Referring to FIG. 1, one embodiment of the hand held, fluid driven film applique tool of the present invention is illustrated generally at 11. The tool 11 comprises a tool head, generally indicated at 13, connected by a shank 17 to a handle 15 for manually holding the tool. At the handle 15, a manually operated switch 25 is provided for connecting the hollow cylinder 19 to a source of fluid under pressure 27.

The tool head 13 comprises a hollow cylinder 19 for receiving a protrusion (not shown), such as, the head of a fastener, for example, a screw or rivet and the like. The hollow cylinder 19 is surrounded by an annual surface 21 which is relatively flat and smooth so that it will not deform the film (not shown) to be applied. The annual surface 21, in the embodiment of FIG. 1, is provide with an elastomeric O-ring 23.

Figure 2:
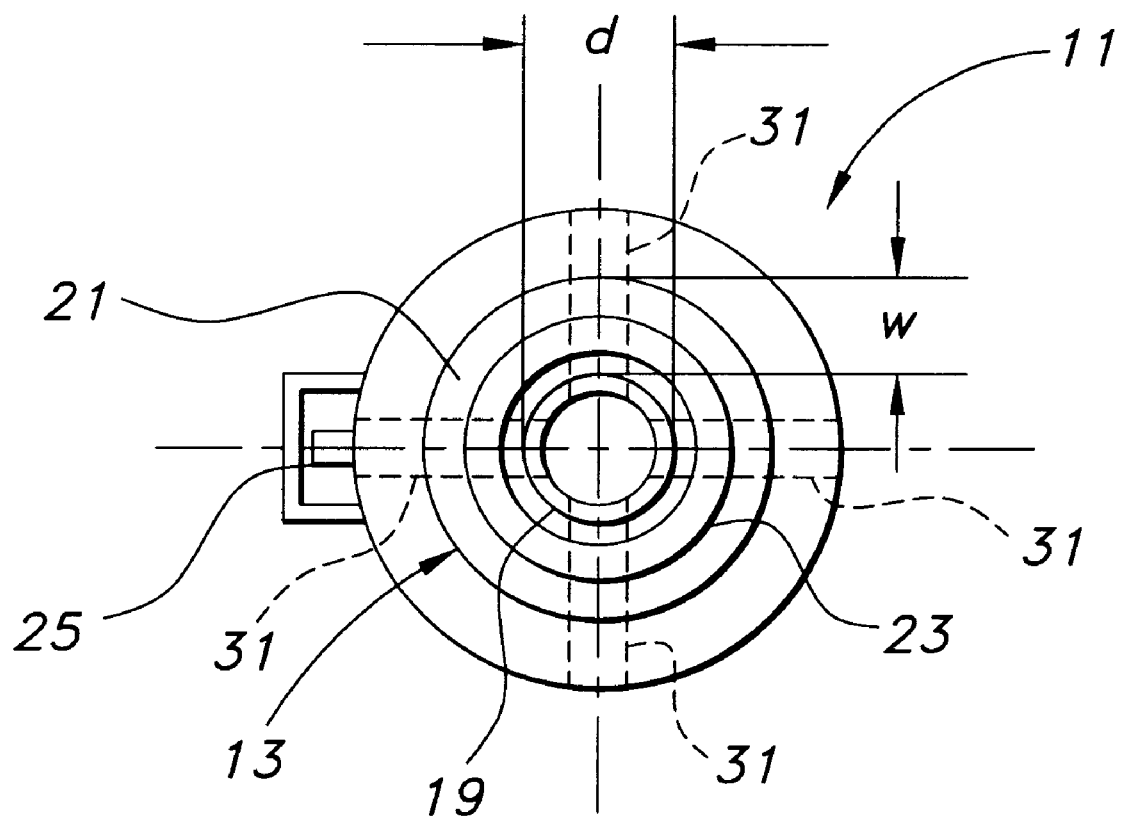
FIG. 2 is a top view of the film applique tool of FIG. 1 illustrating the tool head.

As best seen in FIG. 2, an inner diameter d of the hollow cylinder 19 is at least equal to a diameter of the protrusion plus a thickness of the film to be applied. According to a further embodiment of the present invention, the inner diameter d of the hollow cylinder 19 can further enclose at least some of the aircraft surface local to the periphery of the protrusion, i.e., the fastener head. In addition, a width w of the annual surface 21 is approximately equal to about one quarter to about one half or more of the inner diameter d of the hollow cylinder 19.

In operation, the tool head 13 is placed over the protrusion so that the hollow cylinder 19 receives at least the protrusion and the film overlying the protrusion and the tool 11 is pushed against the aircraft surface so that the annual surface 21 is pressing the film against the aircraft surface. Thereafter, the operator hits the switch 25 to connect the hollow cylinder 19 to the source of fluid under pressure 27. Fluid pressure is applied to the film at the hollow cylinder 19 to stretch the film and press the film firmly against both the protrusion and an area of the surface surrounding the protrusion to assure that the film is flatly and completely applied at the protrusion and to the surface in the area surrounding the protrusion.

The shank 17 is provided with a conduit 29 for conducting the fluid under pressure from the handle 15 to the hollow cylinder 19. In order to control the pressure of the fluid at the hollow cylinder, one or more exhaust channels 31 are formed in the shank 17, for example, by drill or during forging of the shank 17. The exhaust channels 31 are in fluid communication with the atmosphere to permit the escape of the fluid under pressure prior to reaching the hollow cylinders 19. The channels 31 are tapped so that tap screws 33 can be screwed therein to close one or more of the channels 31 to vary the pressure of the fluid at the hollow cylinder 19.

Although the present invention has been described with particular reference to its preferred embodiments, it should be understood that many variations and modifications will now be obvious to those skilled in that art, and it is preferred, therefore, that the scope of the invention be limited, not by the specific disclosure herein, but only by the appended claims.

What is claimed is:

1. A hand held, fluid driven film applique tool for applying a film having an adhesive backing to a surface having a protrusion, the tool comprising:
    a tool head comprising a hollow cylinder for receiving the protrusion, the hollow cylinder being surrounded by an annular surface which is relatively flat and smooth;
    a handle for holding the tool; and
    a switch for connecting the hollow cylinder to a source of fluid under pressure;
    wherein the tool head is placed over the protrusion so that the hollow cylinder receives at least the protrusion and the film overlying the protrusion; and
    wherein fluid pressure is applied to the film by connecting the hollow cylinder to the source of fluid pressure to stretch and press the film firmly against both the protrusion and an area of the surface surrounding the protrusion to assure that the film is flatly and completely applied at the protrusion and to the surface in the area surrounding the protrusion.

2. A film applique tool according to claim 1, wherein an inner diameter of the hollow cylinder is at least equal to a diameter of the protrusion plus a thickness of the film to be applied.

3. A film applique tool according to claim 1, wherein an inner diameter of the hollow cylinder is greater than a diameter of the protrusion plus a thickness of the film being applied.

4. A film applique tool according to claim 1, wherein a width of the annular bottom surface is at least equal to about one quarter to about one half of the inner diameter of the hollow cylinder.

5. A film applique tool according to claim 2, wherein a width of the annular bottom surface is at least equal to about one quarter to about one half of an inner diameter of the hollow cylinder.

6. A film applique tool according to claim 3, wherein a width of the annular bottom surface is at least equal to about one quarter to about one half of an inner diameter of the hollow cylinder.

7. A film applique tool according to claim 1, wherein a shank connects the handle to the tool head.

8. A film applique tool according to claim 7, wherein the shank includes a fluid conduit for conducting the fluid under pressure to the tool head.

9. A film applique tool according to claim 8, wherein the fluid conduit further include at least one exhaust channel which can be selectively opened and closed to vary a pressure of the fluid at the tool head.

10. A film applique tool according to claim 1, further comprising means for varying a pressure of the fluid at the tool head.

* * * * *